Aug. 21, 1923.
C. W. SAALBURG
COMPOSITE PICTURE
Original Filed Sept. 21, 1917
1,465,564
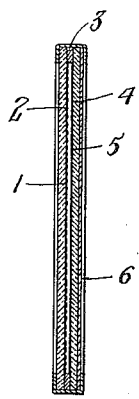
Fig:1.
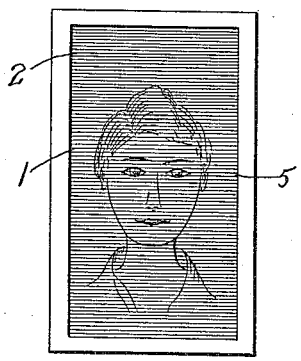
Fig:2.
INVENTOR
Charles W. Saalburg
BY
Prindle, Wright & Small
ATTORNEYS Patented Aug. 21, 1923.

1,465,564

UNITED STATES PATENT OFFICE.

CHARLES W. SAALBURG, OF NEW YORK, N. Y., ASSIGNOR TO ANIMATED PICTURE PRODUCTS CO. INC., A CORPORATION OF DELAWARE.

COMPOSITE PICTURE.

Application filed September 21, 1917, Serial No. 192,462. Renewed January 18, 1923.

*To all whom it may concern:*

Be it known that I, CHARLES W. SAALBURG, of New York city, in the county of New York and in the State of New York, have invented a certain new and useful Improvement in Composite Pictures, and do hereby declare that the following is a full, clear, and exact description thereof.

My invention relates particularly to pictures which are composed of a plurality of views and which may be so arranged that, by changing the angle thereof, first one picture may be seen, then the other; or which may be arranged so as to produce a stereoscopic effect.

The object of my invention is to provide pictures of the above character so arranged that they may be viewed without the aid of transmitted light, and which are so arranged that the light utilized is merely the light reflected from the side of the picture from which it is viewed.

A further object of my invention is to provide pictures of this character in which the light used in viewing the pictures falls upon the same side of the pictures from which the said pictures are viewed.

A further object is to produce opaque pictures having a white or bright background, so that the pictures may be viewed merely by the use of the light falling thereon and reflected therefrom to the eye.

Further objects of my invention will appear from the detailed description thereof contained hereinafter.

While my invention is capable of being carried out in many different ways, for the purpose of illustration I have shown only one form of my invention in the accompanying drawings, in which Figure 1 is a vertical section of a picture made in accordance with my invention; and Figure 2 is a front elevation of a composite picture which is used in connection with my invention.

In the drawings, I have shown a transparent front plate 1, which may be made of glass, and which contains a plurality of vertical or horizontal opaque lines 2, located close together and in the rear of said plate, a spacing member 3 against the rear of which there is placed a transparent plate 4, which may be made of glass, carrying a photographic surface 5, in the form of a composite made up of two separate pictures, each of which is made up of a series of lines extending in the same direction as the lines 2, but in such a manner that the lines of one of said pictures alternate with the lines of the other of said pictures. In the rear of the plate 4, there is a sheet of material 6, to provide a white or bright background, as for example a sheet of paper.

In the operation of my invention, the picture will be viewed from the side which carries the transparent plate 1, and the light for viewing the picture will fall thereon from the same side.

In the case where the lines 2 are arranged in a vertical position and the lines in the pictures 5 are also in a vertical position, by changing the angle of the composite picture to the eye by movement on a vertical axis, first one of said pictures and then the other will become visible, due to the light reflected from the white or bright background 6.

If the pictures are successive views of a moving object, the result will be such as to give the effect of motion. If such is not the case, but two different subjects are contained on the two pictures, the result will be to give the effect of dissolving views.

The same effects, of course, can be obtained by locating the lines 2 in a horizontal position and the lines of the two pictures 5 also in a horizontal position, when the composite picture is moved on a horizontal axis.

In the case, however, where the lines 2 and the lines of the pictures 5 are located in a vertical position, the two pictures 5 may be two views taken of an object from different angles, as in the case of taking stereoscopic views. A composite picture, when provided with such views, will give a stereoscopic effect without changing the angle of the composite picture to the eye. Pictures so arranged can be used to give the result of motion or dissolving views or a stereoscopic effect without the necessity of providing a source of light in the rear of the composite picture, and without the necessity of providing any screen which is movable with regard to the pictures contained in the composite picture.

The apparatus is, therefore, such that it can be readily viewed in daylight in the usual way by the reflection of the same, and it is furthermore so constructed that the parts of the composite picture maintain a fixed relation, so that they do not become dislodged by continual use.

While I have described my invention above in detail, I wish it to be understood that many changes may be made therein without departing from the spirit of my invention.

I claim:

1. A composite picture comprising a lined screen, a translucent plate carrying a plurality of pictures located in alternating lines, said plate being located rearwardly of said screen, and a light reflecting surface located rearwardly of said translucent plate.

2. A composite picture comprising a lined screen, a translucent plate carrying a plurality of pictures located in alternating lines, said plate being located rearwardly of said screen, a member spacing said plate from said screen, and a light reflecting surface located rearwardly of said plate.

3. A composite picture comprising a transparent screen having lines on the rear surface thereof, a translucent plate provided with a plurality of pictures formed in alternating lines, said plate being located to the rear of said screen, a member spacing said plate from said screen, and a light reflecting surface at the rear of said plate.

4. A changeable exhibitor comprising a transparent screen having lines on the rear surface thereof, a translucent plate having a plurality of designs formed in lines on the front surface thereof, said plate being located to the rear of said screen, a member spacing said plate from said screen, and a light reflecting surface at the rear of said plate.

In testimony that I claim the foregoing I have hereunto set my hand.

CHARLES W. SAALBURG.